(«12») United States Patent
Xie et al.

(10) Patent No.: US 11,403,528 B2
(45) Date of Patent: Aug. 2, 2022

(54) SELF-TUNING INCREMENTAL MODEL COMPRESSION SOLUTION IN DEEP NEURAL NETWORK WITH GUARANTEED ACCURACY PERFORMANCE

(71) Applicant: Kneron (Taiwan) Co., Ltd., Taipei (TW)

(72) Inventors: Bike Xie, San Diego, CA (US); Junjie Su, San Diego, CA (US); Jie Wu, San Diego, CA (US); Bodong Zhang, Shenyang (CN); Chun-Chen Liu, San Diego, CA (US)

(73) Assignee: Kneron (Taiwan) Co., Ltd., Taipei (TW)

( * ) Notice: Subject to any disclaimer, the term of this patent is extended or adjusted under 35 U.S.C. 154(b) by 722 days.

(21) Appl. No.: 16/388,840

(22) Filed: Apr. 18, 2019

(65) Prior Publication Data

US 2019/0370658 A1 Dec. 5, 2019

Related U.S. Application Data

(60) Provisional application No. 62/678,278, filed on May 31, 2018.

(51) Int. Cl.
*G06N 3/08* (2006.01)
*G06N 20/10* (2019.01)

(52) U.S. Cl.
CPC ............ *G06N 3/082* (2013.01); *G06N 20/10* (2019.01)

(58) Field of Classification Search
None
See application file for complete search history.

(56) References Cited

U.S. PATENT DOCUMENTS

2016/0321541 A1 11/2016 Liu
2018/0114114 A1 4/2018 Molchanov
(Continued)

FOREIGN PATENT DOCUMENTS

CN 107688850 A 2/2018
CN 107729999 A 2/2018
(Continued)

OTHER PUBLICATIONS

Li et al., Pruning Filters for Efficient Convnets, arXiv:1608.08710v3 [cs.CV] Mar. 10, 2017; 1-13 (Year: 2017).*
(Continued)

*Primary Examiner* — Alan Chen
(74) *Attorney, Agent, or Firm* — Winston Hsu

(57) ABSTRACT

A method of compressing a pre-trained deep neural network model includes inputting the pre-trained deep neural network model as a candidate model. The candidate model is compressed by increasing sparsity of the candidate, removing at least one batch normalization layer present in the candidate model, and quantizing all remaining weights into fixed-point representation to form a compressed model. Accuracy of the compressed model is then determined utilizing an end-user training and validation data set. Compression of the candidate model is repeated when the accuracy improves. Hyper parameters for compressing the candidate model are adjusted, then compression of the candidate model is repeated when the accuracy declines. The compressed model is output for inference utilization when the accuracy meets or exceeds the end-user performance metric and target.

16 Claims, 3 Drawing Sheets

(56) References Cited

U.S. PATENT DOCUMENTS

| | | | |
|---|---|---|---|
| 2019/0050734 A1 | 2/2019 | Li | |
| 2019/0138901 A1* | 5/2019 | Meyer | G06N 3/08 |
| 2019/0251441 A1* | 8/2019 | Lu | G06N 3/0454 |
| 2019/0251444 A1* | 8/2019 | Alakuijala | G06N 3/084 |
| 2019/0295282 A1* | 9/2019 | Smolyanskiy | G06T 1/20 |

FOREIGN PATENT DOCUMENTS

| | | |
|---|---|---|
| CN | 107977703 A | 5/2018 |
| TW | 201818302 A | 5/2018 |

OTHER PUBLICATIONS

Ge et al., Compressing Deep Neural Networks for Efficient Visual Inference, Proceedings of the IEEE International Conference on Multimedia and Expo (ICME) 2017; pp. 667-672 (Year: 2017).*

Zhou et al., Incremental Network Quantization: Towards Lossless CNNS With Low-Precision Weights, arXiv:1702.03044v2 [cs.CV] Aug. 25, 2017; pp. 1-14 (Year: 2017).*

Liu et al., Learning Efficient Convolutional Networks through Network Slimming, 2017 IEEE International Conference on Computer Vision; pp. 2755-2763 (Year: 2017).*

* cited by examiner

SELF-TUNING INCREMENTAL MODEL COMPRESSION SOLUTION IN DEEP NEURAL NETWORK WITH GUARANTEED ACCURACY PERFORMANCE

CROSS REFERENCE TO RELATED APPLICATIONS

This application claims the benefits of U.S. Provisional Application No. 62/678,278, filed May 31, 2018 and included herein by reference in its entirety.

BACKGROUND OF THE INVENTION

1. Field of the Invention

This application relates to compression of a large-scale deep neural network, more specifically to compression of a large-scale deep neural network with guaranteed accuracy performance.

2. Description of the Prior Art

A large-scale deep neural network (DNN) has achieved remarkable performance on the cutting-edge tasks in the fields of computer vision, image recognition, and speech recognition. Thanks to a large amount of data sets, intensive computational power, and memory storage, deep learning models become bigger and deeper to learn better from scratch. However, the high computation intensity of these models cannot deployment on resource-limited end-user with low memory storage and computing capabilities, such as mobile phones and embedded devices. Moreover, learning from scratch is not feasible for an end-user to develop customized deep learning models because of the limited data set.

SUMMARY OF THE INVENTION

A method of compressing a pre-trained deep neural network model is proposed. The deep neural network model comprises a plurality of layers, each of the plurality of layers comprising at least one node representing a weight. The method comprises inputting the pre-trained deep neural network model as a candidate model. The candidate model is compressed by increasing sparsity of the candidate model by removing at least one node from at least one layer, removing at least one batch normalization layer present in the candidate model, and quantizing all remaining weights into fixed-point representation to form a compressed model. Accuracy of the compressed model is then determined utilizing an end-user training and validation data set. Compression of the candidate model utilizing the compressed model as the candidate model is repeated when the accuracy improves and the accuracy is lower than an end-user performance metric and target. Hyper parameters for compressing the candidate model are adjusted, and then compression of the candidate model is repeated when the accuracy declines. The compressed model is output for inference utilization when the accuracy meets or exceeds the end-user performance metric and target.

A method of compressing a pre-trained deep neural network model is proposed. The pre-trained deep neural network model comprising a plurality of layers, each of the plurality of layers comprising at least one node representing a weight. The method comprises inputting the pre-trained deep neural network model as a candidate model. The candidate model is compressed by removing at least one node or layer to form a compressed model. The compressed model is utilized for inference utilizing a set of unknown data.

A device is also configured to compress a pre-trained deep neural network model, the deep neural network model comprising a plurality of layers, each of the plurality of layers comprising at least one node representing a weight. The device comprises a processor and a non-transitory memory electrically coupled to the processor, the memory comprising computer code, which when executed by the processor causes the processor to perform the steps of inputting the pre-trained deep neural network model as a candidate model, compressing the candidate model by increasing sparsity of the candidate model by removing at least one node from at least one layer, removing at least one batch normalization layer present in the candidate model, and quantizing all remaining weights into fixed-point representation to form a compressed model, determining accuracy of the compressed model utilizing an end-user training and validation data set, repeat compressing the candidate model utilizing the compressed model as the candidate model when the accuracy improves and when the accuracy is lower than an end-user performance metric and target, adjusting hyper parameters for compressing the candidate model and repeat compressing the candidate model when the accuracy declines, and outputting the compressed model for inference utilization when the accuracy meets or exceeds an end-user performance metric and target.

These and other objectives of the present invention will no doubt become obvious to those of ordinary skill in the art after reading the following detailed description of the preferred embodiment that is illustrated in the various figures and drawings.

DETAILED DESCRIPTION

To address these challenges, a novel self-tuning incremental model compression solution is proposed, which can both reduce the DNN model size and computational requirements while the accuracy performance of the compressed model is guaranteed. This self-tuning model compression solution monitors the compressed model performance during the model compression procedure and automatically adjusts the compression scheme based on the measured performance.

This proposed model compression solution removes unnecessary layers in a DNN for inference and automatically seeks to induce sparse structure in computationally intense layers.

Figure 1:
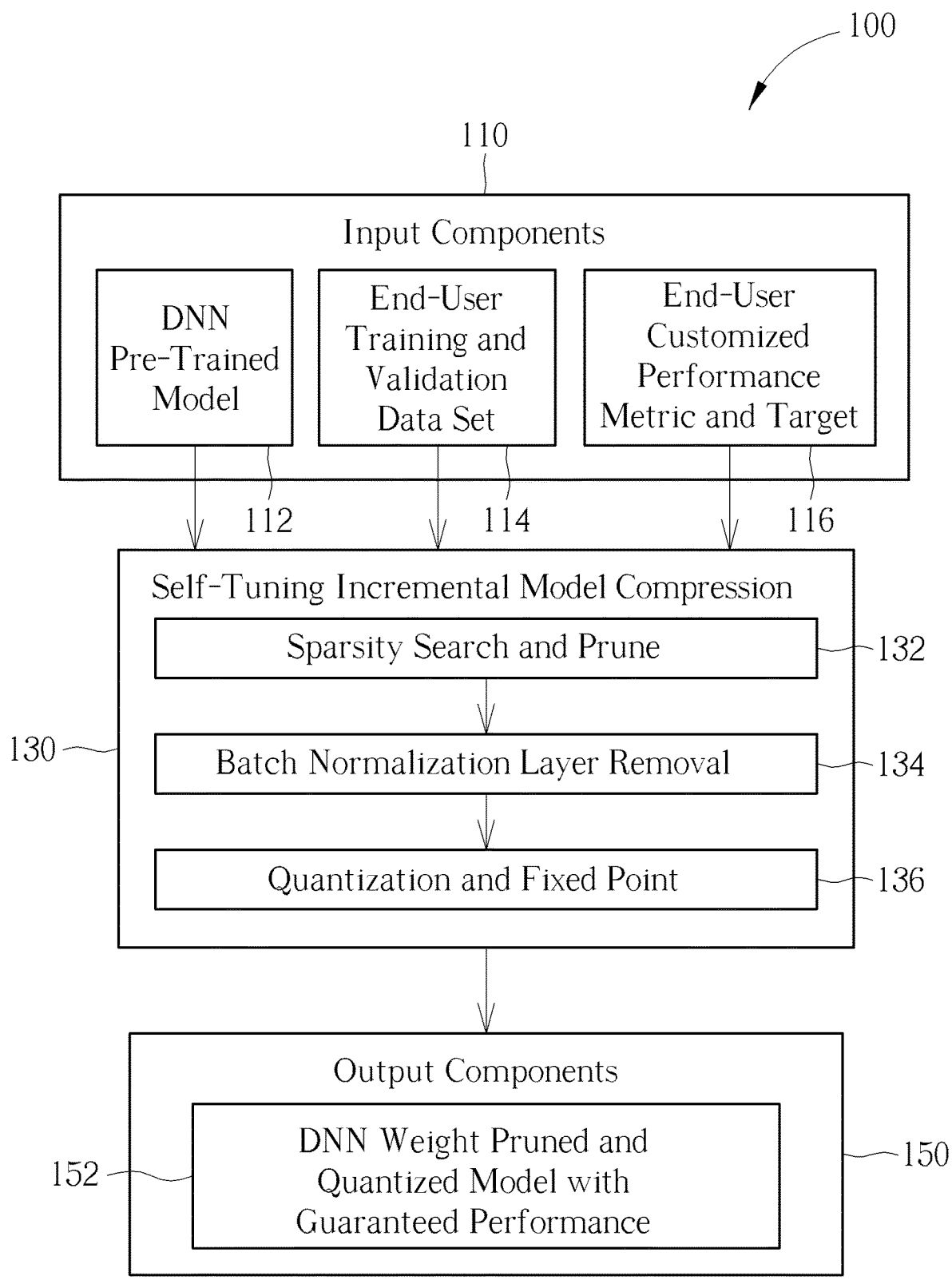
FIG. 1 depicts the block diagram of the model compression framework according to an embodiment of the invention.

FIG. 1 depicts the block diagram of the model compression framework 100. The framework 100 consists of two major components.

(1) Input components 110. These include DNN pre-trained models 112, such as AlexNet, VGG16, RestNet, Mobile- Net, GoogLeNet, Sufflenet, ResNext, Xception Network and so on, the end-user limited training and validation dataset 114, and the end-user customized performance metric 116.

(2) A self-tuning model compression 130 technique analyzes the sparsity of the pre-trained model 112, automatically prunes and quantized the network redundancy, and removes unnecessary layers for inference in the model, 132, 134, 136. Meanwhile, inspired by the supervised learning transfer approach, the proposed technique re-uses parameters trained on source domain data and constructs the base model to describe the common features of the end-user customized application.

By re-using the hidden layers of the base model as the initial values, the end-user deep learning model can be constructed using a small data set. Applying the proposed techniques, we obtain the end-user deep learning model within customized model size and acceptable computational complexity.

The self-tuning model compression 132 comprises three steps in preferably in sequence. The first step 132 is to search the network redundancy and analyzes the sparsity of the pre-trained model 112. For the end-user application, some network parameters are redundant, and the model compression solution can automatically construct the sparsity by removing these redundant parameters.

The second step 134 is to remove batch normalization layers in the network. The batch normalization layers are introduced to make model training easier to converge and are widely applied in most of the popular networks such as Inception V2, V3, V4, Xception, MobileNet. The batch normalization layer mainly scales the input network features and adds bias on each network feature. Even though the total computation amount is not large for batch normalization layers, these batch normalization layers consume considerable time for inference because the computation can hardly be sped up using a CPU, GPU, or DSP.

The last step 136 is to quantize all the weights into fixed-point representation. The fixed-point representation is done layer by layer. For each layer, the self-tuning model compression determines the fixed-point integer bit width and fractional bit width. All weights in that layer are quantized accordingly. For dense layers and convolution-type layers (convolution layers, depthwise convolution layers), kernel weights and bias weights have separate fixed-point integer bit width and fractional bit width.

After all three steps 132, 134, 136 are done, the weight pruned and quantized model is ready. Because the model weights are quantized, and batch normalization layers are removed, the model inference speed is faster and could be much faster than that of the original model. Because the network pruning and weight quantization, the output model could be stored using much less memory by applying certain compression coding such as (but not limited to) run-length coding, Hoffman coding, and both.

Figure 2:
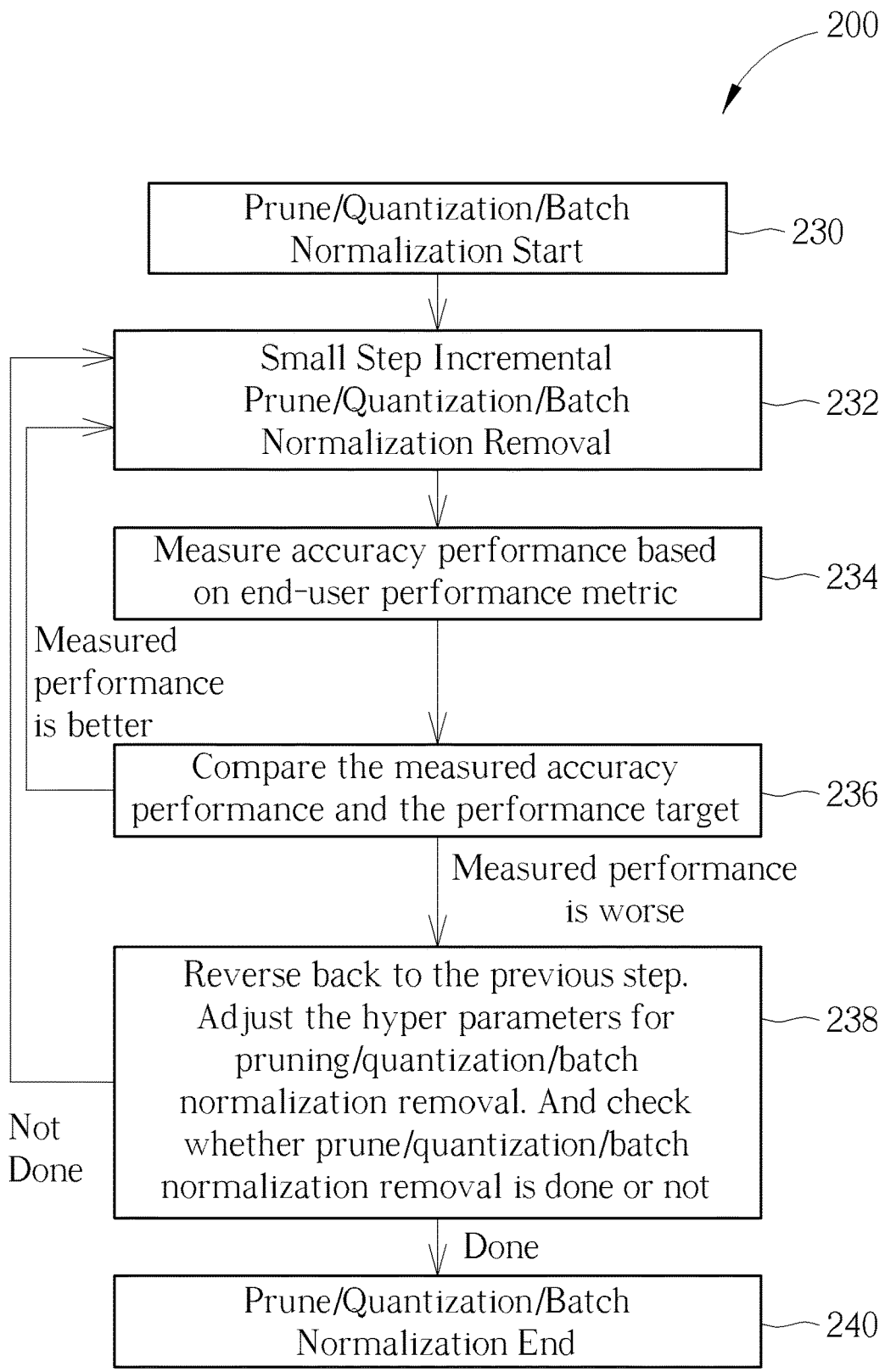
FIG. 2 illustrates the pruning, quantization, and batch normalization removal steps inside the model compression shown in FIG. 1.

In order to guarantee the accuracy performance, all these three steps 132, 134, 136 are performed with accuracy performance monitored. Based on the end-user validation data set 114 and end-user customized performance metric 116 from input components 110, the self-tuning incremental model compression 100 develops an accuracy performance measurement. The pruning 132, quantization 136, and batch normalization removal 134 steps inside the model compression 100 are performed incrementally as shown in FIG. 2 as compression flow 200.

In compression flow 200, step 232 may comprise all of steps 132, 134, 136 performed sequentially at one time. However, in some embodiments it is preferred to iterate through steps 232 through 238 at least three times, but may be performed as many times as desired according to the end-user customized performance metric 116 or other factors, where only one of steps 132, 134, 136 is performed in each iteration before the comparison step 236. It is further preferred that successive iterations perform steps 132, 134, 136 successively; however, it is not necessary. For example, only step 132 may be performed in sequential iterations, followed by only step 134 in subsequent iterations, followed by only step 136.

According to the end-user customized performance metric 116 or other considerations, satisfactory results may also be obtained using the compression flow 200 using only a single one or a single pair of steps 132, 134, 136 instead of using all three steps 132, 134, 136 as in the above embodiment. Any combination of 1 or more of steps 132, 134, 136 in step 232 to produce output components 150 of the DNN Weight Pruned and Quantized Model with Guaranteed Performance 152 falls within the scope of the claims.

After each small step of pruning or quantization or batch normalization removal, the proposed solution checks the accuracy performance based on the given end-user performance metric. If the performance is better than the given target, then continue the small step incremental model compression. If the measured performance is worse than the given target, the solution first reverses the model to a previous step, which has accuracy performance better than the target and then adjusts the model compression hyper parameters such as reducing pruning/quantization step size. After the hyper parameters are adjusted, then continue the small step incremental model compression. At this step, the solution also checks whether the pruning/quantization/batch normalization removal is complete or not. If it is complete, then go to the pruning/quantization/batch normalization removal end state 240.

Figure 3:
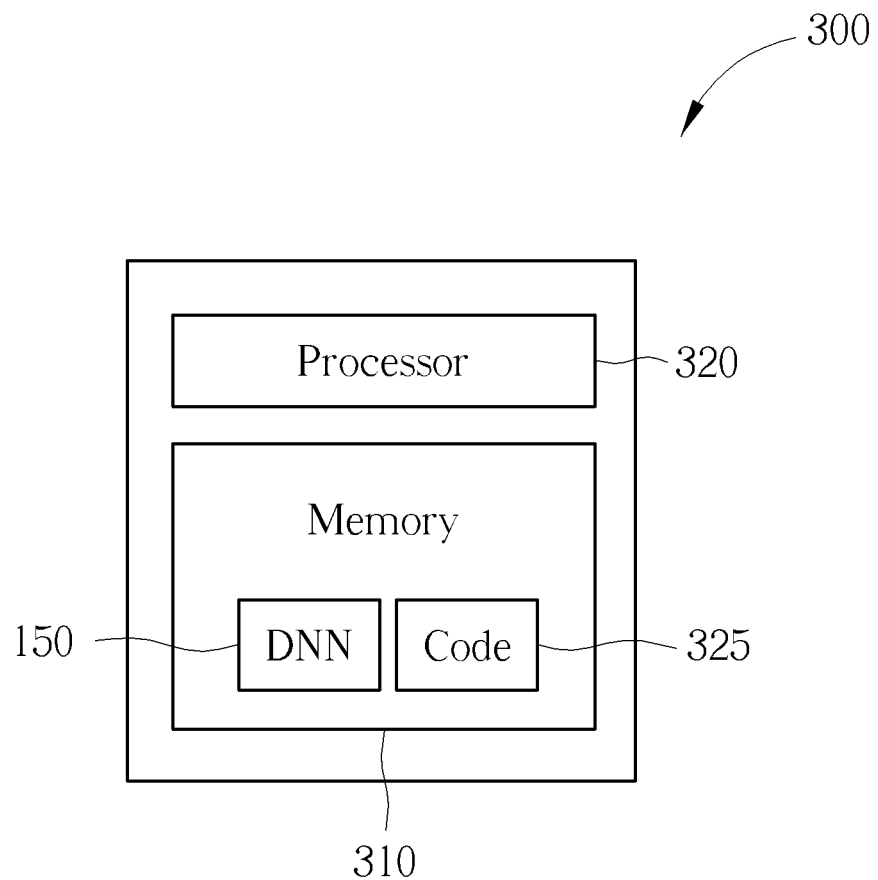
FIG. 3 is a block diagram of a device configured to perform the model compression framework of FIG. 1 and/or FIG. 2 according to some embodiments of the invention.

The output components 150 of the DNN Weight Pruned and Quantized Model 152 can serve to perform inference for known and unknown data in a device 300 such as shown in FIG. 3. Device 300 may comprise a processor 320 to perform needed computations and a memory 310 comprising the output components 150. In some embodiments, the output components 150 of the DNN Weight Pruned and Quantized Model 152 may be implemented utilizing at least one of software, firmware, and hardware.

Device 300 may also illustrate a device configured to perform the DNN compression method described herein, where the memory 310 comprises computer code 325, which when executed by the processor 320, performs the compression method on a trained DNN to generate the output components 150 of the DNN Weight Pruned and Quantized Model 152. The compression method caused by executing the computer code 325 may include inputting the pre-trained deep neural network model as a candidate model, compressing the candidate model by increasing sparsity of the candidate model by removing at least one node from at least one layer, removing at least one batch normalization layer present in the candidate model, and quantizing all remaining weights into fixed-point representation to form a compressed model, determining accuracy of the compressed model utilizing an end-user training and validation data set, repeat compressing the candidate model utilizing the compressed model as the candidate model when the accuracy improves and when the accuracy is lower than an end-user performance metric and target, adjusting hyper parameters for compressing the candidate model and repeat compressing the candidate model when the accuracy declines, and outputting the compressed model for inference utilization when the accuracy meets or exceeds an end-user performance metric and target.

The output components 150 of the DNN Weight Pruned and Quantized Model 150 offer distinct advances over conventional technology in the field of Neural Networks. Because the method begins with a pre-trained model as input, convergence and accuracy are already present in the model. Because the size of the DNN is reduced, implementation requirements, such as memory, hardware, or processing necessities, are also reduced. Furthermore, because of the disclosed method of compressing a DNN, inference can be achieved with much increased speed and much decreased computational requirements. Lastly, due to the disclosed method of compression, these benefits occur while guaranteeing accuracy during inference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of compressing a pre-trained deep neural network model, the deep neural network model comprising a plurality of layers, each of the plurality of layers comprising at least one node representing a weight, the method comprising:
   inputting the pre-trained deep neural network model as a candidate model;
   compressing the candidate model by increasing sparsity of the candidate model by removing at least one node from at least one layer, removing at least one batch normalization layer present in the candidate model, and quantizing all remaining weights into fixed-point representation to form a compressed model;
   determining accuracy of the compressed model utilizing an end-user training and validation data set;
   repeat compressing the candidate model utilizing the compressed model as the candidate model when the accuracy improves and the accuracy is lower than an end-user performance metric and target;
   adjusting hyper parameters for compressing the candidate model and repeat compressing the candidate model when the accuracy declines; and
   outputting the compressed model for inference utilization when the accuracy meets or exceeds the end-user performance metric and target.

2. The method of claim 1 further comprising increasing the sparsity of the candidate model by removing at least one redundant parameter.

3. The method of claim 1 further comprising quantizing all remaining weights into fixed-point representation layer by layer, for each layer, the fixed-point integer bit width and fractional bit width is determined and all weights in that layer are quantized accordingly.

4. The method of claim 3 wherein for dense layers and convolution-type layers, kernel weights and bias weights have separate fixed-point integer bit width and fractional bit width.

5. A method of compressing a pre-trained deep neural network model, the deep neural network model comprising a plurality of layers, each of the plurality of layers comprising at least one node representing a weight, the method comprising:
   inputting the pre-trained deep neural network model as a candidate model;
   compressing the candidate model by removing at least one node or layer to form a compressed model;
   removing at least one batch normalization layer present in the candidate model; and
   after removing the at least one batch normalization layer present in the candidate model, utilizing the compressed model for inference utilizing a set of unknown data.

6. The method of claim 5 further comprising increasing sparsity of the candidate model by removing at least one node from at least one layer before utilizing the compressed model for inference.

7. The method of claim 5 further comprising quantizing all remaining weights into fixed-point representation to form the compressed model before utilizing the compressed model for inference.

8. The method of claim 5 further comprising determining accuracy of the compressed model utilizing an end-user training and validation data set.

9. The method of claim 8 further comprising repeating compressing the candidate model utilizing the respective compressed model as the candidate model when the accuracy improves before utilizing the compressed model for inference.

10. The method of claim 8 further comprising adjusting hyper parameters utilized for compressing the candidate model and repeat compressing the candidate model when the accuracy declines before utilizing the compressed model for inference.

11. The method of claim 8 further comprising storing the compressed model to a memory when the accuracy exceeds an end-user performance metric and target before utilizing the compressed model for inference.

12. The method of claim 5 wherein compressing the candidate model by removing the at least one node or layer to form the compressed model comprises steps of increasing sparsity of the candidate model by removing the at least one node from at least one layer, removing at least one batch normalization layer present in the candidate model, and quantizing all remaining weights into fixed-point representation to form the compressed model executed sequentially in stated order.

13. A device configured to compress a pre-trained deep neural network model, the deep neural network model comprising a plurality of layers, each of the plurality of layers comprising at least one node representing a weight, the device comprising:
   a processor; and
   a non-transitory memory electrically coupled to the processor, the memory comprising computer code, which when executed by the processor causes the processor to perform the steps of:
   inputting the pre-trained deep neural network model as a candidate model;
   compressing the candidate model by increasing sparsity of the candidate model by removing at least one node from at least one layer, removing at least one batch normalization layer present in the candidate model, and quantizing all remaining weights into fixed-point representation to form a compressed model;
   determining accuracy of the compressed model utilizing an end-user training and validation data set;
   repeat compressing the candidate model utilizing the compressed model as the candidate model when the accuracy improves and when the accuracy is lower than an end-user performance metric and target;

adjusting hyper parameters for compressing the candidate model and repeat compressing the candidate model when the accuracy declines; and outputting the compressed model for inference utilization when the accuracy meets or exceeds an end-user performance metric and target.

14. The device of claim 13 wherein the computer code, which when executed by the processor causes the processor to further perform a step of increasing the sparsity of the candidate model by removing at least one redundant parameter.

15. The device of claim 13 wherein the computer code, which when executed by the processor causes the processor to further perform a step of quantizing all remaining weights into fixed-point representation layer by layer, for each layer, the fixed-point integer bit width and fractional bit width is determined and all weights in that layer are quantized accordingly.

16. The device of claim 13 wherein the computer code, which when executed by the processor causes the processor to further perform a step for dense layers and convolution-type layers, quantize kernel weights and bias weights to have separate fixed-point integer bit width and fractional bit width.

* * * * *